United States Patent Office 3,177,181
Patented Apr. 6, 1965

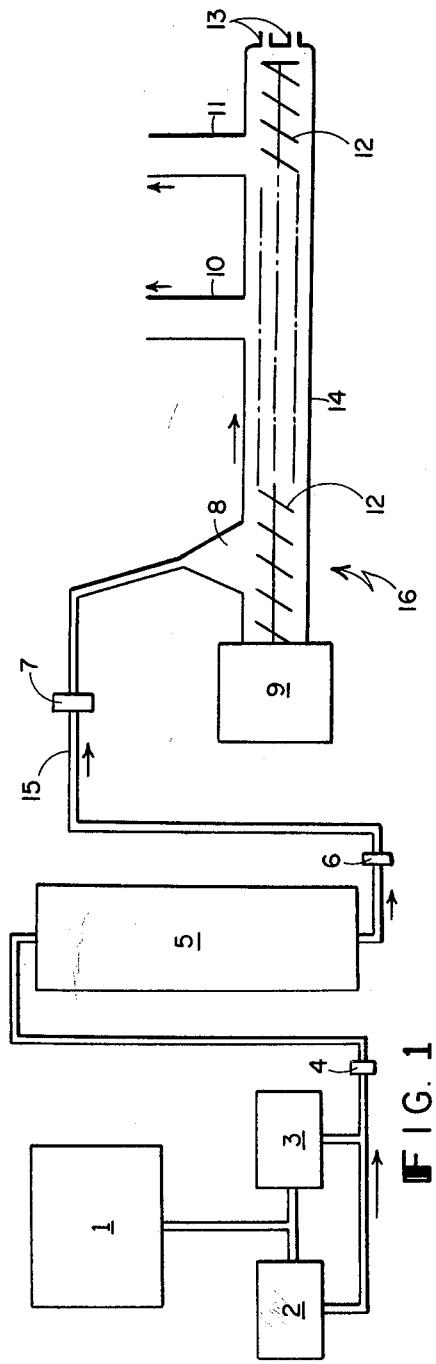
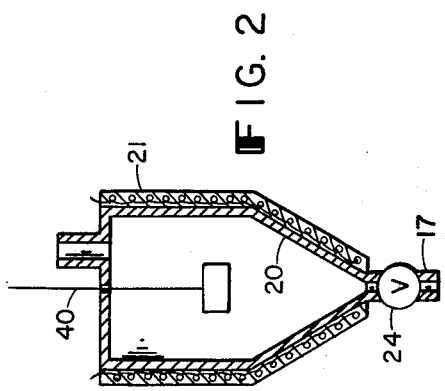

3,177,181
TWO STAGE VACUUM DEVOLATILIZATION
TO PURIFY POLYAMIDES
Sidney J. Baum, Fitchburg, and Rene Aelion, Groton,
Mass., assignors to Foster Grant Co., Inc., Leominster,
Mass., a corporation of Delaware
Filed Nov. 14, 1960, Ser. No. 69,144
5 Claims. (Cl. 260—78)

This invention relates generally to the devolatilization of polyamides. More specifically, this invention relates to a method and apparatus for removing volatile materials from synthetic high molecular weight linear polyamides.

Linear polyamides or "nylons" having high molecular weights are well known in the art. These nylon materials possess extremely desirable chemical and physical properties, viz., toughness, rigidity, abrasion and chemical resistance, high elastic recovery, etc. However, these properties are known to be impaired unless the polymers have been substantially stripped of their extractable content.

Since the preparation of certain nylon polymers results in a polymeric mass containing extractable monomer and oligomers, devolatization or extraction is essential. Herein, "oligomers" refer to polymers containing from about two to about ten repeating units of the monomeric structure. The extractable content will vary considerably depending on the particular nylon material and its method of preparation. In general, self-condensation of 5, 6 or 7 carbon atom monoamino monocarboxylic acids or their esters, amides and lactams such as caprolactam, aminocaproic acid, aminoheptanoic acid, etc. results in the corresponding nylon with high monomer and oligomer content. These resulting polymers, therefore, can be alternatively termed poly(aminocarboxylic acid)-type polyamides.

Previous methods of removing extractable materials from nylon polymers have been proven costly and time consuming. One method involves drawing the polymeric mass through a boiling water or other solvent bath wherein the extractable monomers and oligomers become dissolved. However, this method is slow and after extraction two major problems remain; namely, the nylon polymer must be thoroughly dried and the dissolved monomer must be recovered since it may comprise as much as 13% by weight or higher of the extracted nylon polymer. Drying by conventional methods is slow and monomer recovery involves evaporation, concentration and distillation steps.

Another known method of removal is carried out during polymerization in a falling-film type apparatus wherein a vacuum is applied to the nylon material as it runs down the walls of the apparatus to the bottom thereof. There is little control of the time during which the molten polymer stays in the vacuum state since it flows only by gravity. This can lead to undesirable further polymerization in the apparatus. It also results in several undesirable processes at the interface between the flowing polymer and the evaporating gases. For example, the presence of even small amounts of oxygen in the apparatus causes oxidation at the interface, or thermal degradation may occur as a result of delayed flow of the polymer in sections of the heated apparatus walls. Moreover, gelation of the nylon polymers may also occur in this process. Because of these problems, this method is limited to the production of polymers of low viscosity, useful for injection molding, but not for extrusion molding.

We have now found, most unexpectedly, that nylon materials can be produced and successfully devolatilized in a continuous or discontinuous polymerization system incorporating a vented, devolatilizing extrusion zone. We have found this expedient extremely advantageous in rapidly removing extractable monomer and oligomers from nylon materials without resorting to drying or further processing steps.

Our invention involves employing pressure to push heated polymerized material from a polymerization zone to a heated extruder, provided with at least one vacuum vent. The vent or vents comprise passages wherein the atmospheric pressure is reduced. As the nylon polymer in the heated extruder is advanced through the extrusion zone past the vent or vents, the reduced pressure areas allow evaporation of the volatile materials (monomers and oligomers) and the nylon polymers once past the vent or vents are essentially in a devolatilized state. The vacuum vent or vents lead the volatilized gases directly into a condensing zone wherein rapid and economical separation and recovery of the valuable recovered monomer may be achieved. Since the polymerization may be carried out as a one phase liquid procedure with a controlled polymerization rate, oxidation, gelation and degradation of the nylon materials is avoided. Following this procedure, high or low viscosity nylon materials in final forms are produced.

In its more specific aspects, our invention may comprise, as illustrated herein, three sections, i.e., a monomer storage and compounding section, a polymerization section and a devolatilizing extruder section as hereinafter described.

In the first section, monomeric material is heated to a molten state in a conventional heated storage tank connected to compounding tanks wherein various additives, e.g., catalysts, fillers, dyes, etc., may be incorporated in the monomeric material. The polymerization section may comprise a conventional polymerization apparatus, i.e., batch or continuous. For illustrative purposes, a continuous process utilizing a continuous polymerization tower is described. Liquid monomer is continuously fed into the upper portion of a tower. Polymerization takes place as the monomeric material moves down the tower and the resultant molten polymer is continuously withdrawn from the lower portion. The molten polymer is then passed by means of pipes or passageways through an expansion pump into the third section of our system. A conventional pressure regulating and cut-off valve is positioned in the passageways between the polymerization section and the third or devolatilizing extruder section.

The third section comprises a conventional extruder having at least one and preferably two or more vacuum vents or passageways in its barrel. These vents allow vacuum conditions to be applied to the nylon polymer maintained in the range from about 200 to about 300° C. during its passage through the extruder. By properly adjusting the temperature and vacuum conditions within the vented extruder a substantial proportion of the volatile monomer and oligomers therein are removed. The nylon polymer may then be extruded directly in the shape desired. Thus, it is possible to form nylon monomer directly into finally desired devolatilized products; e.g., rods, films, monofilaments, etc., in an uninterrupted procedure.

Our invention will be easily understood from the following description with reference to the drawings in which like numerals indicate like parts.

FIGURE 1 is a diagrammatic sketch of a process and apparatus of our invention.

FIGURE 2 is a side section view of a conventional batch type kettle.

General conditions will be recited for caprolactam polymerization and devolatilization; however, it should be understood that these conditions may vary depending on the size of the equipment utilized, the specific rate of flow desired, the temperature, vacuum and number of vents employed. If any one of these conditions are varied it may be necessary to adjust the others accordingly. Further, the values will be varied when employing other nylon materials.

Caprolactam monomer from storage tank 1 is blended with additives, i.e., catalysts, dyes, etc. in tanks 2 and 3 and pumped by liquid feed pump 4 into the top of continuous polymerization tower 5 under pressure. Some degree of pressure on the liquid will be maintained throughout the system. Polymerization tower 5 is a conventional nylon polymerization tower comprising a closed vessel having a capacity of approximately 1500 pounds of monomer and containing heating coils in its walls. The capacity of the tower 5 may vary depending on the overall capacity of the system desired.

The caprolactam monomer is polymerized in the tower 5 at a temperature of approximately 240° C. to 260° C. in the substantial absence of air. A one phase (liquid) system is maintained throughout the operation eliminating all danger of oxidation by air. The polymeric nylon 6 or polycaprolactam is forced out of the bottom of tower 5 through conventional expansion pump 6 at a pressure of approximately 150 p.s.i. along passage 15. A conventional cut-off valve is employed at 7 on line 15 so that if the pressure in the line builds up beyond a desirable safety level the pump 6 will be slowed or stopped and the passage of polymer will be reduced or shut off. Thus, cut-off valve 7 may be employed to maintain the desired feeding pressure in line 15 to the extruder. The build up of pressure may occur if the polymer is fed into the extruder at too fast a rate or blockage of the extruder occurs. The nylon polymer enters the screw extruder 16 through opening or hopper 8 under approximately 150 p.s.i. pressure and at approximately 240 to 260° C. It is important that the liquid polymer completely fill the extruder so that the vacuum is maintained in the vents and air leakage along the barrel of the extruder is prevented. Several entrance openings may be provided if desired.

The extruder 16 may be a conventional 1¾" extruder with two one inch diameter vents or tubes 10 and 11 located along the barrel of the extruder approximately 6 inches apart and 19 and 25 inches respectively from the extrusion orifice 13. Obviously, any conventional vented type extruder may be employed. The stock thickness of the polymer as it passed the vents is no greater than approximately 0.287 inch. The number and position of vents along the barrel may vary, however, it is highly desirable to utilize at least two vents. The nylon polymer moves into the extruder through opening 8. It is carried along the barrel of the extruder by the combined effect of the pressure and screw 12 driven by a conventional motor and reducer 9. The screw of the extruder is of conventional design and will prevent polymeric material from entering vents 10 and 11. The barrel 14 of the extruder is heated by conventional heating units to a temperature of from 220° C. to 300° C. and preferably 240° C. to 260° C.

As the caprolactam polymer moves past vent 10, which is maintained at a constant vacuum condition of from 2 to 40 and preferably 10 to 25 mm. of mercury, a substantial proportion of the caprolactam monomer remaining therein during the polymerization will be vaporized and carried off in tube or vent 10 to be recovered by condensation. A vacuum of 0.005 to 10 mm. and preferably 0.01 to 4 mm. of mercury is maintained in tube or vent 11. Under these conditions a substantial proportion of the oligomers present in the polycaprolactam will be vaporized and removed from the caprolactam polymer through tube 11. Thus, the use of two vents or tubes is extremely advantageous in our invention since such an expedient results in simultaneous devolatilization and substantial separation of monomer and oligomers. The caprolactam polymer is then extruded through orifice 13 which may be of any desired shape or size.

The tube or vent 10 may be connected to a condensing unit, not shown, of the type disclosed in U.S. patent application Serial No. 58,750 filed September 27, 1960 and assigned to the present assignee, Foster Grant Co., Inc., Docket 68, Gaseous Condensation. The gaseous materials recovered in tube or vent 10 consisting essentially of caprolactam may be condensed and further purified in said unit while the oligomers recovered in vent 11 may be discarded.

It will be understood that the rate of flow may be varied. Theoretically there is an interplay of at least two factors that are used to determine the rate of flow of the material in the extruder. Firstly, it is desirable to have a slow rate of flow in order to allow for sufficient evaporation of the monomer and oligomers at vents 10 and 11. Additionally, nylon polymers undergo a reformation or shifting of the equilibrium of the polymerization reaction, when exposed to high temperatures. Thus, as the polymer travels through the extruder a certain amount of the polymer will "reequilibrate" or reform to monomer. Therefore, it is desirable to place the extrusion orifice or orifices as near to the monomer extraction vent as possible and to move the material through the extruder as rapidly as possible. We have found that the reformation factor is of prime consideration in determining the rate of flow of the nylon polymer. For polycaprolactam, a suitable rate of flow employing the above conditions and equipment sizes is approximately 7 to 100 lbs. per hour preferably 20 to 40 lbs. per hour.

Vent openings 10 and 11 and the passageways connected thereto are heated to approximately 70° C. to 100° C. and 200° C. to 330° C. respectively in order to keep the monomers and oligomers in vapor form as they move along the respective passageways. If desired, a single vent may be employed to collect the oligomers and monomers, however, in such case it is necessary to later separate these materials by a separate step. We have further found that when monomers and oligomers are volatalized together in a single vent the passageway carrying such mixture is rapidly clogged at lower temperature by oligomers solidifying and collecting on the walls of the passage. If the walls are heated to approximately 260° C. to 330° C. to prevent deposition of the oligomers in the passageways, the monomer will tend to degrade. We have found by employing separate vent passages for the monomers and oligomers we can adjust the temperature of each passage so as to prevent fouling and clogging, thus enabling efficient operation.

When polycaprolactam or nylon 6 is produced by the above method and apparatus it has about 10 percent by weight of extractables when leaving tower 5, with 7% by weight being monomer and 3% by weight being oligomers. When leaving the extruder the extractable level is cut to about 1.8% by weight. It will be appreciated that the final level of extractables can be reduced to as low as 0.3% by weight by varying the rate of flow, temperatures, vacuums, vent openings and extruder size accordingly.

As previously recited, the continuous tower polymerization technique, wherein a liquid monomer is constantly added to a tower as the polymer is withdrawn is the preferred method. However, batch polymerization in a conventional kettle may also be employed in our invention. In such polymerization, a kettle, as shown in FIGURE 2, is provided having a funnel bottom 20 attached to a gate valve 24. The kettle, having heating coils 21 in its sides and a conventional stirrer 40, may vary in size from a capacity of 100 to 10,000 pounds or higher of monomer. The monomer is introduced to the kettle at its top under a blanket of nitrogen. When the desired conversion is achieved, the nitrogen pressure is increased. The gate valve 24 is opened and the polymer is forced by increased nitrogen pressure into passage 17. This type of process is advantageous for use in small batch type operations and allows for rapid change of monomer formulation.

Obviously, it is within the scope of this invention to use a vented extruder to devolatilize nylon polymer produced by any method. While nylon polymer in powder or pellet form may be devolatilized by passing it through a vented extruder under the proper temperature and vacuum conditions, however, such a procedure is not as desirable in terms of time and expense as is the continuous series of steps herein described.

It is further possible to devolatilize polyamide materials previously formed by other methods. In such a case the polyamide material may be dry or melt fed into a devolatilizing extruder. The following examples are further illustrative of specific examples of vacuum devolatilization and are not to be construed as limiting. In these examples all viscosities are recited as relative viscosities in a solution containing 1 gram of polymer per 100 cubic centimeter of 98% by weight sulfuric acid at 25° C.

Example 1

Polycaprolactam pellets, having viscosity of 2.18 are fed into a standard 2½ inch extruder. The polycaproactam contains about 9.5% by weight of extractable monomer and oligomers. The extruder is a single screw extruder having a length to diameter ratio of approximately 24 to 1. The barrel of the exruder is heated in three equal sections to temperatures of 225° C., 225° C., and 230° C., respectively. A single vent pipe of approximately 1 inch diameter having a conventional 0.2 inch opening obturation plate is employed opening in the third heated section of the extruder barrel. The portion of the extruder screw at the vent pipe has a channel diameter of approximately 0.574 inch less than the barrel diameter. Thus, a polymer stock thickness of less than 0.287 inch is employed at the vent opening. The vent pipe is heated to 250° C. and has a vacuum of 11 mm. of mercury maintained therein. Extruding 60 pounds of polycaprolactam per hour 2 mono-filaments of 0.150 inch diameter each are formed at the extrusion orifice. The monofilament material has a viscosity of 2.23. The total extractable level of monomer and oligomers in the resultant product is 2.87% by weight.

Example 2

Example 1 is repeated with 90 pounds of material being extruded per hour. The resultant product contains 2.4% by weight extractables and has a viscosity of 2.20.

Example 3

Polycaprolactam pellets as employed in Example 1 are fed into a standard 1¾ inch extruder maintained at approximately 240–250° C. and having a length to diameter ratio of approximately 30 to 1. First and second vacuum vent pipes of approximately 1 inch diameter having conventional 0.2 inch opening obturation plates are employed in the 62 inch extruder barrel approximately 19 to 25 inches respectively from the extrusion orifice end. The first vacuum vent is maintained at 70° C. and 19 mm. of mercury while the second vacuum vent is maintained at 260° C. and 5 mm. of mercury. The portion of the extruder screw at each vent pipe has a channel diameter of approximately 0.574 inch less than the barrel diameter. Thus, the stock thickness at each vent is no greater than 0.287 inch. The polymeric material is extruded as an 0.1 inch diameter strand at a rate of 14 pounds per hour, having a viscosity of 2.45. The water extractable level is 1.86% by weight.

Example 4

Example 3 is repeated employing a vacuum of 22 mm. of mercury at the first vacuum vent and 3 mm. of mercury at the second vacuum vent. The polymeric strand produced has a viscosity of 2.31 and a water extractable level of 2.18% by weight.

Example 5

Into a stainless steel kettle of the type shown in FIGURE 2 is loaded 1,000 pounds of caprolactam and 30 pounds of aminocaproic acid under a nitrogen blanket of 30 pounds per square inch. The temperature of the reaction mixture is raised to 260° C. After 30 hours of polymerization at that temperature gate valve 24 is opened and the nitrogen pressure is increased to 100 p.s.i. The reaction mixture is forced through pipe 17 directly into a 3 inch extruder the barrel of which is heated to 260° C. First and second vacuum vent pipes of approximately 1 inch diameter are provided in the extruder barrel approximately 19 to 25 inches respectively from the extrusion orifice end of the 62 inch long extruder. The first vacuum vent pipe is maintained at 70° C. and 19 mm. of mercury while the second vacuum vent is maintained at 260° C. and 5 mm. of mercury. A stock thickness of 0.3 inch is maintained at each vent pipe. The polymeric material is extruded as four 0.1 inch diameter strands at a rate of 100 pounds per hour, having a viscosity of 4. The water extractable level of the polymer produced is 1.5% by weight. It should be understood that the water extractable level corresponds to the amount of monomer and oligomers in the resultant product.

Many alterations and changes may be made without departing from the spirit and scope of this invention which is set forth in the following claims which are to be construed as broadly as possible in view of the prior art.

We claim:

1. A method of polymer purification wherein unpolymerized monomer and volatilizable low molecular weight oligomers are removed from a poly(aminocarboxylic acid)-type polyamide reaction product, said method comprising:
    feeding said polyamide reaction product through an extrusion zone in a molten state at a temperature in the range from about 200° C. to about 300° C.;
    extracting at least a predominant portion of the monomer by feeding the molten polymers past a first venting passage in the extrustion zone, said passage being maintained at a subatmospheric pressure of from about 2 to about 40 millimeters of mercury;
    maintaining said predominant portion of the extracted monomer at a temperature of from about 70° C. to about 100° C.;
    extracting at least a predominant portion of the oligomers by feeding the molten polymer past a second venting passage in the extrusion zone, said second passage being maintained at a subatmospheric pressure lower than said first passage up to about 40 millimeters of mercury;
    maintaining said predominant portion of the extracted oligomers at a temperature of from about 200° C. to about 330° C.;
    and extruding the substantially molten polyamide product from which there has been removal of at least a portion of unwanted monomers and oligomers to recover the purified poly(aminocarboxylic acid)-type polyamide product.

2. A method of claim 1 wherein the polymer is polycaprolactam.

3. A method of polymer purification wherein the unpolymerized monomer and volatilizable low molecular weight polymerized monomer are removed from a poly(aminocarboxylic acid)-type polyamide reaction product, said method comprising:
    maintaining said polyamide reaction product in a molten state at a temperature in the range from about 200° C. to about 300° C. as said molten polymer is fed through an extrusion zone;
    treating said molten polymer by applying a subatmospheric pressure of from about 10 to about 25 millimeters of mercury as said polymer passes a first vent in the extrusion zone communicating with the advancing polymer mass to extract at least a predominant portion of the monomer;

removing the thereby vented discharge at a temperature of from about 70° C. to about 100° C.;

treating said molten polymer by applying a venting subatmospheric pressure lower than the pressure in the first vent from about 0.01 to about 10 millimeters of mercury as said polymer passes a second vent in the extrusion zone communicating with the advancing polymer mass to extract at least a predominant portion of the oligomers;

removing the thereby vented discharge at a temperature from about 200° C. to about 330° C.;

and extruding the substantially molten polyamide product from which there has been removal of unwanted monomers and said low molecular weight polymerized monomer to recover the purified poly(aminocarboxylic acid)-type polyamide product.

4. A method of claim 3 wherein the molten polymer is treated by applying a venting subatmospheric pressure from about .01 to about 4 millimeters of mercury as said polymer passes the second vent.

5. A method of claim 3 wherein the polymer is polycaprolactam.

References Cited by the Examiner

UNITED STATES PATENTS 2,735,840  2/56  Lynch _____ 260—78
2,745,824  5/56  Melchore _____ 260—95

FOREIGN PATENTS 711,956  7/56  Great Britain.
716,216  9/54  Great Britain.

WILLIAM H. SHORT, *Primary Examiner.*

H. N. BURSTEIN, LOUISE P. QUAST, JOSEPH L. SCHOFER, *Examiner.*